(12) United States Patent
Bedenk et al.

(10) Patent No.: US 9,388,852 B2
(45) Date of Patent: Jul. 12, 2016

(54) ELASTICALLY SUPPORTED ROLLING BEARING ARRANGEMENT

(71) Applicant: Schaeffler Technologies AG & Co. KG, Herzogenaurach (DE)

(72) Inventors: Johannes Bedenk, Theres (DE); Christian Pröschel, Wuerzburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/646,278

(22) PCT Filed: Aug. 28, 2013

(86) PCT No.: PCT/DE2013/200140
§ 371 (c)(1),
(2) Date: May 20, 2015

(87) PCT Pub. No.: WO2014/079419
PCT Pub. Date: May 30, 2014

(65) Prior Publication Data
US 2015/0316095 A1    Nov. 5, 2015

(30) Foreign Application Priority Data

Nov. 22, 2012 (DE) .......................... 10 2012 221 369

(51) Int. Cl.
*F16C 27/04* (2006.01)
*F16C 27/00* (2006.01)
*F16C 19/06* (2006.01)
*F16C 33/58* (2006.01)

(52) U.S. Cl.
CPC ................ *F16C 27/00* (2013.01); *F16C 19/06* (2013.01); *F16C 27/04* (2013.01); *F16C 33/586* (2013.01)

(58) Field of Classification Search
CPC ................................. F16C 27/04; F16C 33/58
See application file for complete search history.

(56) References Cited

U.S. PATENT DOCUMENTS

| 3,186,779 | A | * | 6/1965 | Chapman | F01D 25/164 |
|---|---|---|---|---|---|
| | | | | | 384/535 |
| 3,473,853 | A | * | 10/1969 | Bill | F01D 25/164 |
| | | | | | 384/215 |
| 3,504,955 | A | * | 4/1970 | Bailey | F16C 27/04 |
| | | | | | 384/535 |
| 3,653,731 | A | | 4/1972 | Rau | |
| 3,709,570 | A | | 1/1973 | Galbato | |

(Continued)

FOREIGN PATENT DOCUMENTS

| DE | 20 2006 019697 | 4/2007 |
|---|---|---|
| DE | 10 2010 061926 | 5/2012 |
| WO | WO2011092411 | 8/2011 |

*Primary Examiner* — Thomas R. Hannon
(74) *Attorney, Agent, or Firm* — Davidson, Davidson & Kappel, LLC

(57) ABSTRACT

A rolling bearing, particularly for a gas turbine, includes a plurality of rolling elements (4) arranged between an inner ring (2) and outer ring (3), and a housing structure (8) on which the outer ring (3) is elastically mounted. The outer ring (3) is constructed in one piece and has a raceway section (7) forming a raceway (6) for the rolling elements (4), a spring section (21) and a flange (10) screwed to the housing structure (8). The spring section (21) is constructed from a plurality of spring bars (12) which adjoin a deflection section (9) adjoining the raceway section (7) at the end face thereof and adjoin the flange (10), are arranged radially outside the raceway section (7) and do not protrude axially beyond the deflection section (9) and the race way section (7).

10 Claims, 2 Drawing Sheets

(56) References Cited

U.S. PATENT DOCUMENTS

| | | | | |
|---|---|---|---|---|
| 4,872,767 A | * | 10/1989 | Knapp | F01D 25/164 384/535 |
| 4,927,326 A | | 5/1990 | Von Pragenau | |
| 5,931,585 A | * | 8/1999 | Malchow | F16C 25/083 384/535 |
| 6,413,046 B1 | | 7/2002 | Penn et al. | |
| 6,443,698 B1 | | 9/2002 | Corattiyil et al. | |
| 7,384,199 B2 | | 6/2008 | Allmon et al. | |
| 8,646,978 B2 | | 2/2014 | Jadczak et al. | |
| 2008/0063334 A1 | * | 3/2008 | Gillespie | F01D 25/162 384/535 |

* cited by examiner

ELASTICALLY SUPPORTED ROLLING BEARING ARRANGEMENT

The present invention relates to a rolling bearing, which is suitable for use in a gas turbine, for example a jet engine of an aircraft, and which includes an outer ring which is elastically connected to a housing part.

BACKGROUND

Rolling bearings of the type mentioned at the outset are known, for example, from U.S. Pat. No. 7,384,199 B2, U.S. Pat. No. 6,443,698 B1, and U.S. Pat. No. 6,413,046 B1. In each of these cases, an outer ring of a radial rolling bearing designed as a roller bearing is elongated in the axial direction by a spring section, which is fastened to a housing part with the aid of a screw connection.

SUMMARY OF THE INVENTION

It is an object of the present invention to provide a rolling bearing having an elastically suspended outer ring with respect to the prior art, in particular with regard to the required installation space.

The present invention provides a rolling bearing, which is suitable, in particular, for a gas turbine, including
  a number of rolling elements situated between an inner ring and an outer ring;
  a housing structure, to which the outer ring is elastically fastened, the outer ring having a one-piece design and a raceway section forming a raceway for the rolling elements, a spring section and a flange, which is screwed to the housing structure,
  the spring section being made from a plurality of spring rods, which abut the front side of a deflecting section adjacent to the raceway section, on the one hand, and which abut the flange, on the other hand, are situated radially outside the raceway section and, in the axial direction, do not project beyond the deflecting section, on the one hand, and do not project beyond the raceway section, on the other hand.

Refinements of the rolling bearing according to the present invention are the subject matter of the dependent claims. The term "inner ring" mentioned in Claim 1 is to be understood functionally and includes any rotatable component which is situated radially within the outer ring and on which the rolling elements roll. In each case, the rolling bearing is designed as a radial bearing, preferably as a ball bearing.

The deflecting section represents one part of the outer ring and may have an annular design or be formed by sections of the spring rods abutting the raceway section. In both cases, a connection between the raceway section and the spring rods or the sections of the spring rods positioned radially at a distance from the raceway section is established by the deflecting section.

The present invention is directed to the idea that, when supporting fast moving turbine shafts on rolling bearings, an elastic suspension of the rolling bearing outer ring in the housing is sensible in order to attenuate the introduction of vibrations into the housing.

With respect to the prior art, the present invention is characterized by the fact that the spring rods are situated precisely outside the raceway section in the radial direction, i.e., outside the outer ring in the narrower sense. Compared to a rolling bearing having an outer ring without an elastic suspension, the space requirements of the rolling bearing according to the present invention in the axial direction are thus at most slightly enlarged. The indications "axial" and "radial" always refer to the rotation axis of the rolling bearing. The spring rods run for the most part, in the preferred embodiment completely, in the axial direction. In each case, a recess is situated between two adjacent spring rods, the width of the recess being able to be in an arbitrary relation to the width of the spring rods, viewed in the circumferential direction of the rolling bearing. For example, the width of the recess may correspond to the width of each spring rod. Likewise, it is possible for the recesses to be significantly narrower or wider than the spring rods. The length of one spring rod, i.e., its extension in the axial direction, is not necessarily greater than its width measured in the circumferential direction.

The flange, which represents one part of the outer ring, just like the spring section formed from the spring rods, extends radially outwardly from the side of the spring section facing away from the deflecting section and is preferably fastened to a housing disk, which is fixedly connected to other parts of the housing structure.

In a preferred embodiment, the housing structure, in particular the housing disk, forms a stop with respect to the raceway section in the radial direction and at least one axial direction, preferably in both axial directions. In the first case mentioned, i.e., in the case of a one-sided axial stop, the housing disk projects, for example, from the outside into a shoulder which is provided on a front side of the raceway section, while in the case of a two-sided axial stop, the housing disk engages, for example, with a groove on the outer circumference of the raceway section.

In the case of both a one-sided and a two-sided limitation of the displacement of the raceway section by the housing structure, i.e., in the case of a one-sided or two-sided axial stop, according to one advantageous refinement, a stop of the raceway section in at least one circumferential direction, preferably in exactly one circumferential direction, additionally exists, due to the housing structure. To facilitate a design of this type, a part of the housing structure which interacts directly with the outer ring may have a multi-part design. It is likewise possible to design the raceway section and the housing structure in such a way that the outer ring may be mounted in the housing structure in the manner of a bayonet joint.

According to one advantageous refinement, a damping element, which may be manufactured, for example, from a polymer material or from metal foam, is situated between the essentially cylindrical outer surface of the raceway section and the spring section which is positioned at a radial distance from this surface.

In particular, the advantage of the present invention is that both a vibration damping and an overload protection exist in all relevant load directions, namely in the radial direction, in both axial directions and in one circumferential direction, due to a space-saving, elastic outer ring suspension, optionally including additional damping.

BRIEF DESCRIPTION OF THE DRAWINGS

One exemplary embodiment of the present invention is explained in greater detail below on the basis of a drawing.

DETAILED DESCRIPTION

Figure 1:
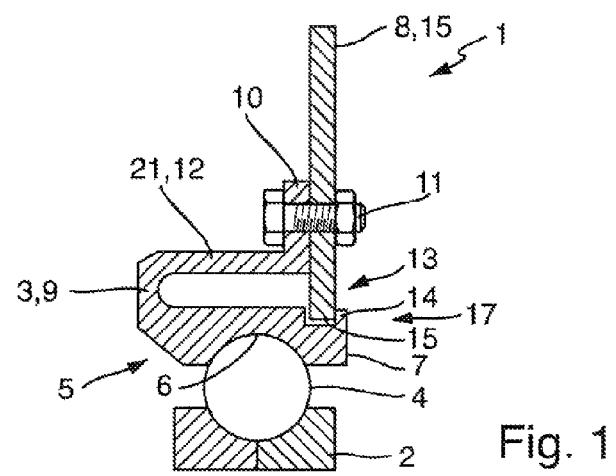
FIG. 1 shows a cross section of a rolling bearing of a gas turbine.

Corresponding parts or parts having the same function are identified by the same reference numerals in all figures.

Figure 2:
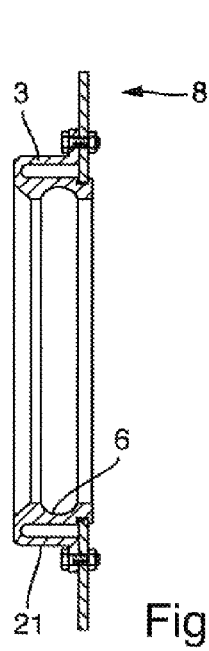
FIGS. 2 and 3 show additional views of parts of the rolling bearing according to FIG. 1.
Figure 3:
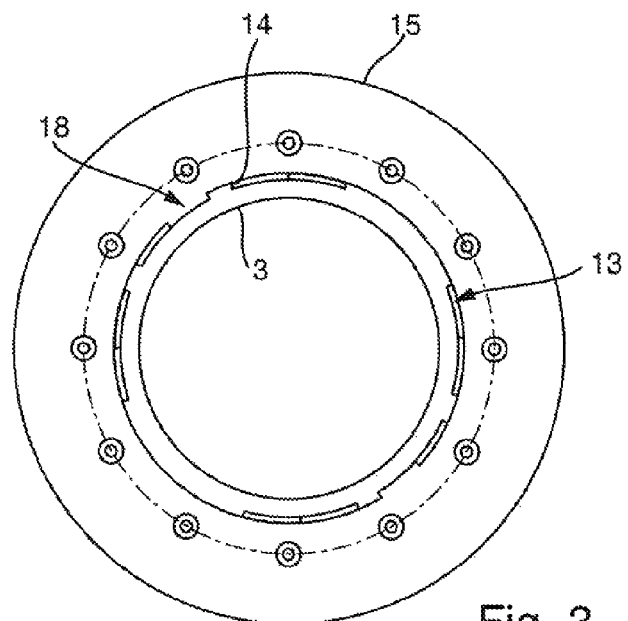

A rolling bearing, which is illustrated in FIGS. 1 through 3 and identified as a whole by reference numeral 1, is designed as a ball bearing and is provided for installation in a gas turbine for the purpose of supporting the turbine shaft. With regard to the principle function of rolling bearing 1, reference is hereby made to the prior art cited at the outset.

Rolling bearing 1 includes rolling elements 4, namely balls, situated between an inner ring 2 and an outer ring 3. Instead of rolling on inner ring 2, which is provided with a multi-part design in the illustrated exemplary embodiment, rolling elements 4 may also roll directly on a shaft. Individual rolling elements 4 are spaced a distance apart by a cage, which is not illustrated, and may be manufactured from steel or ceramic.

Rolling elements 4 roll on a raceway section 7 of outer ring 3. Raceway section 7 is also referred to as "outer ring in the narrower sense." A groove-shaped raceway 6 for rolling elements 4 is situated on the inside of raceway section 7, while the outside of raceway section 7 is essentially cylindrical. Raceway section 7 of outer ring 3 merges in one piece into a radially outwardly directed deflecting section 9, which abuts the raceway section 7 on the front side. A tapering 5 of outer ring 3, which describes a conical shape on the inside of outer ring 3, is provided in the transitional area between raceway section 7 and deflecting section 9.

In turn, deflecting section 9, which describes a U shape to some extent in the cross section according to FIG. 1, merges into a plurality of spring rods 12, which are oriented in parallel to the axis of rolling bearing 1 and are thus positioned at a distance from raceway section 7.

All spring rods 12 are connected to a flange 10, forming a single piece, which is fixedly screwed to a housing structure 8 using screws 11. The totality of spring rods 12 is referred to as spring section 21 of outer ring 3. Outer ring 3 is manufactured from steel by machining a workpiece.

The shape of outer ring 3, which saves space in the axial direction and whose spring section 21 is precisely radially situated outside raceway section 7 and thus does not project beyond raceway section 7 in any axial direction, is particularly advantageous. Flange 10 is likewise situated radially outside raceway section 7 and does not project thereover in the axial direction.

In the exemplary embodiment according to FIG. 1, housing structure 8, to which flange 10 of outer ring 3 is fastened, includes a housing disk 15, which projects over flange 10 both radially inwardly and radially outwardly and engages with its radially inner edge with a circumferential groove 13 in the outer surface of raceway 7. A gap is formed between the inner edge of housing disk 15 and the base of groove 13, which permits a slight displacement of raceway section 7 in the radial direction. At the same time, this forms a stop between raceway section 7 and housing structure 8. The aforementioned gap is dimensioned in such a way that the essentially cylindrical outer surface of raceway section 7 is unable in any case to strike against spring section 21 or flange 10.

Groove 13 is delimited by a collar 14 in the direction of front side 17 of raceway section 7 facing away from deflecting section 9. This collar 14 is interrupted multiple times, as is apparent from FIG. 3. The groove base extends to front side 17 in the interrupted sections of collar 14. Housing disk 15 has a plurality of housing tabs 18 on its inner edge, which are able to engage with the interrupted sections of the collar and thus facilitate an insertion of outer ring 3 into housing disk 15. After outer ring 3 has been inserted into housing disk 15, outer ring 3 may be twisted farther by a limited angle until anti-twisting contours provided between outer ring 3 and housing disk 15 stop a further twisting. In this way, an interaction between outer ring 3 and housing disk 15 is provided in the manner of a bayonet joint. However, degrees of freedom of raceway section 7 in both axial directions, in the radial direction and in the circumferential direction, are maintained due to corresponding gaps. Where the circumferential direction is concerned, a limiting of the twisting motion in one direction, namely the rotation direction of the inner ring and thus the main shaft of the gas turbine, is sufficient, due to the anti-twisting contours between outer ring 3 and housing disk 15.

Figure 4:
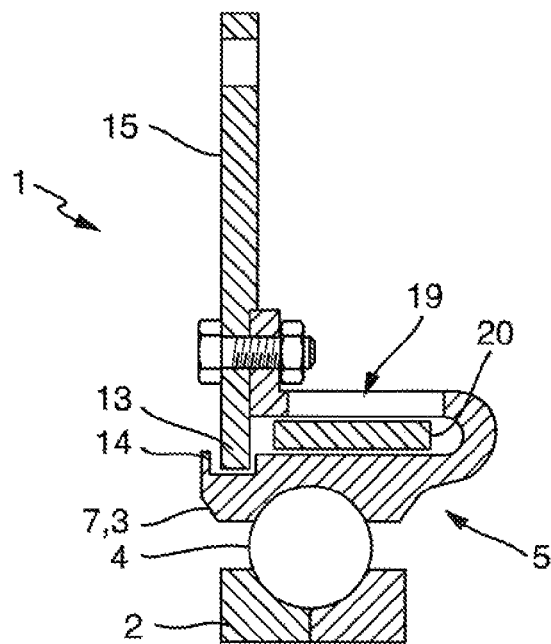
FIGS. 4 and 5 show additional variants of rolling bearings for gas turbines in views similar to FIG. 1.

The exemplary embodiment according to FIG. 4 is identical to the exemplary embodiment according to FIG. 1 with regard to the mechanical function, i.e., the elastic outer ring suspension of a rolling bearing 1. In this case, an aperture 19 between two spring rods 12 is apparent within spring section 21. A damping element 20 is furthermore apparent, which is situated radially between the outer surface of raceway section 7 and spring section 21 and is designed, for example, as a ring made of an elastomer.

Figure 5:
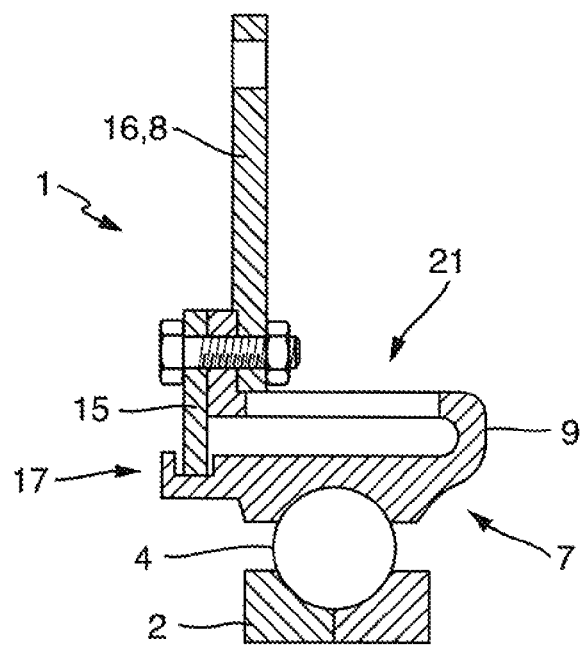

In the exemplary embodiment according to FIG. 5, a first housing disk 15, which is oriented inwardly from flange 10 and a second housing disk 16, which is oriented outwardly from flange 10, are apparent as components of housing structure 8. Both housing disks 15, 16 are screwed to outer ring 3 with the aid of the same screws 11. Inner housing disk 15 is composed of two individual parts, each of which extends over an angle of 180°. In this case, an engagement of housing disk 15 with groove 13, and thus an axial securing of raceway section 7 of outer ring 3 on both sides, may be established even without a bayonet joint.

LIST OF REFERENCE NUMERALS 1 rolling bearing
2 inner ring
3 outer ring
4 rolling element
5 tapering
6 raceway
7 raceway section
8 housing structure
9 deflecting section
10 flange
11 screw
12 spring rod
13 groove
14 collar
15 housing disk
16 housing disk
17 front side
18 housing tab
19 aperture
20 damping element
21 spring section

What is claimed is:
1. A rolling bearing comprising:
a number of rolling elements situated between an inner ring and an outer ring;
a housing structure, the outer ring being elastically fastened to the housing structure, the outer ring having a one-piece design and a raceway section forming a raceway for the rolling elements, a spring section and a flange, the flange being screwed to the housing structure, the spring section being made from a plurality of spring rods, the spring rods abutting a front side of a deflecting section adjacent to the raceway section, on the one hand, and the flange, on the other hand, and situated radially outside the raceway section and, in the axial direction, not projecting beyond the deflecting section on the one hand, and not projecting beyond the raceway section, on the other hand.

2. The rolling bearing as recited in claim 1 wherein the housing structure includes at least one housing disk.

3. The rolling bearing as recited in claim 2 wherein the housing structure forms both a radial and an axial stop with respect to the raceway section of the outer ring.

4. The rolling bearing as recited in claim 3 wherein the housing structure forms a two-sided axial stop with respect to the raceway section of the outer ring.

5. The rolling bearing as recited in claim 3 wherein the housing structure additionally forms a stop in the circumferential direction with respect to the raceway section of the outer ring.

6. The rolling bearing as recited in claim 5 wherein the housing structure has a multi-part design.

7. The rolling bearing as recited in claim 5 wherein the housing structure engages with recesses in the raceway section of the outer ring in the manner of a bayonet joint.

8. The rolling bearing as recited in claim 2 wherein the rolling elements are designed as balls.

9. The rolling bearing as recited in claim 2 further comprising a damping element situated between the raceway section and the spring section.

10. A gas turbine roller bearing comprising the roller bearing as recited in claim 2.

\* \* \* \* \*